United States Patent
Conway

[11] 4,140,999
[45] Feb. 20, 1979

[54] TRANSFORMER HOT SPOT DETECTION SYSTEM

[75] Inventor: William H. Conway, Hacienda Heights, Calif.

[73] Assignee: Robertshaw Controls Company, Richmond, Va.

[21] Appl. No.: 682,197

[22] Filed: May 3, 1976

[51] Int. Cl.² ............................................. G08C 19/12
[52] U.S. Cl. .................................. 340/207 R; 73/350; 331/66; 340/208; 340/310 R
[58] Field of Search ............... 340/207 R, 207 P, 208, 340/310 R, 228 R; 324/55, 105; 73/350, 362 R; 317/14 R, 14 H, 14 J, 40 R; 331/66, 116 R; 361/35, 37

[56] References Cited

U.S. PATENT DOCUMENTS

| | | | |
|---|---|---|---|
| 2,625,821 | 1/1953 | Stein | 73/350 |
| 3,297,913 | 1/1967 | Schweitzer | 317/14 R |
| 3,519,924 | 7/1970 | Burton | 331/66 |
| 3,801,970 | 4/1974 | Barnes | 340/207 R |
| 3,849,705 | 11/1974 | McElroy | 317/14 J |
| 3,855,503 | 12/1974 | Ristuccia | 340/228 R |
| 3,872,455 | 3/1975 | Fuller et al. | 340/207 R |
| 3,960,017 | 6/1976 | Romanowski | 73/350 |

*Primary Examiner*—John W. Caldwell, Sr.
*Assistant Examiner*—James J. Groody
*Attorney, Agent, or Firm*—Fulwider, Patton, Rieber, Lee & Utecht

[57] ABSTRACT

The invention is a system for the detection of hot spots, i.e., localized over-heating, in electrical power transformers and the like which utilize one or more telemetric temperature devices that are embedded at preselected locations in the windings of the transformer and that utilize a coil about the windings to obtain an induced voltage power supply that is rectified and drives an oscillator circuit of the device. The oscillator circuit includes a temperature responsive component that varies the frequency of the oscillator output in response to the local, sensed temperature. The output of the oscillator circuit is coupled to a telemetering facility to broadcast by electromagnetic or ultrasonic radiation the temperature-altered signal to a remote receiver, whereby the telemetric temperature device is isolated and "floats" on the voltage potential of the windings at its location.

15 Claims, 3 Drawing Figures

TRANSFORMER HOT SPOT DETECTION SYSTEM

BACKGROUND OF THE INVENTION

1. Field of the Invention

This invention relates to means for detection of localized over-heating of electrical power transformers and, in particular, to a telemetric system for such detection.

2. Brief Statement of the Prior Art

Electrical power transformers are commonly supplied with temperature indicators that reflect the average electrical loading of the transformer. Commonly, the transformer windings are sealed within a case that is filled with a heat-conductive liquid such as oil and the like. The electrical loading of the transformer is commonly measured by a replica device such as a coil that receives electrical energy in proportion to the total loading of the transformer. Temperature transducers are located in the replica coil and are coupled to indicators external of the transformer case for indicating the temperature of the replica coil, thereby indicating the average temperature condition of the transformer windings. Additionally, temperature indicators are located at various positions in the liquid within the transformer case.

A common difficulty of the aforementioned temperature instruments is that these instruments only determine average loading of the transformers and are not capable of detecting localized over-heating or hot spots such as occur by shorting between adjacent turns of the windings. The latter malfunction develops electrical eddy currents, resulting in inefficient transformer operations and severe overheating that leads to destruction of insulation and ultimate failure, particularly during peak loading conditions on the transformer.

SUMMARY OF THE INVENTION

This invention comprises a detection system for determination of temperatures at pre-selected locations throughout the winding of an electrical power transformer. The detection system includes a plurality of telemetric temperature devices which obtain their operative power supply from the transformer windings and which develop an output, oscillating electrical signal that is frequency altered in response to temperature.

Each of the devices is provided with a coil about a winding of the transformer to produce an induced voltage power supply, rectifier means to obtain a direct current voltage supply, an oscillator circuit means driven by the power supply and having a temperature responsive component such as a capacitor, crystal and the like that is connected in the oscillator circuit means to vary its output frequency in response to the temperature of the component.

The entire telemetric device including the temperature responsive component is located within the transformer windings at pre-selected point locations and in heat exchange relationship thereto whereby the component temperature closely follows that of the windings at such pre-selected point locations.

The output of the oscillatory circuit is coupled to telemetric means to broadcast the temperature-modulated signal, thereby isolating the telemetric device from the receiver facilities. This permits the telemetric device to be placed at any point in the transformer windings, independent of the voltage at such point and eliminates the need for high voltage signal processing means. In the preferred embodiment, the oscillator circuit output is coupled through the power supply coil, to the transformer windings and is detected exteriorly of the transformer casing by windings about the output terminals, e.g., about ceramic bushings of the transformer which are in a tuned tank circuit to resonate at the carrier frequency. The pick-up coil is coupled through a filter and a radio frequency amplifier to an electrical "isolator" such as a phase locked loop oscillator which produces a pure square wave broadcast frequency that is free of background noise. The detection system also employs an oscillator circuit to generate a reference signal at the nominal carrier frequency which is compared, through digital processing, to the temperature shifted oscillating signal, developing a temperature error signal that is applied to a suitable display such as a light emitting diode panel and the like. The detection circuit includes a frequency selecting switch means operatively connected to the phase locked loop signal generator and to the reference signal generator whereby the plurality of telemetric temperature devices within the transformer can be scanned by an observer.

BRIEF DESCRIPTION OF THE DRAWINGS

The presently preferred embodiment of the invention is shown in the figures of which.

DESCRIPTION OF THE PREFERRED EMBODIMENT

Figure 1:
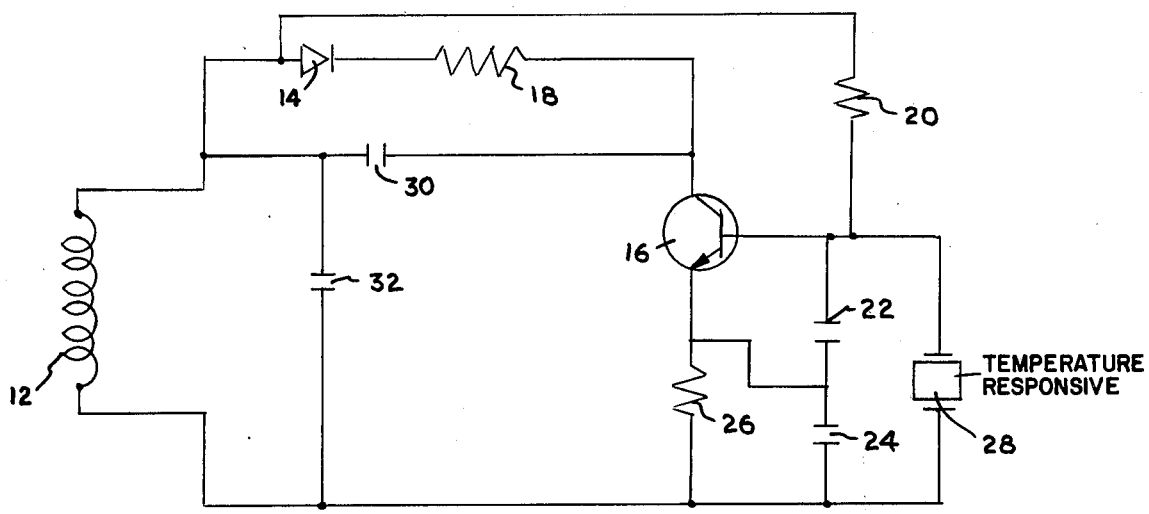
FIG. 1 is an electrical schematic of a telemetric temperature device used in the invention.

Referring now to FIG. 1, the electrical schematic of the preferred telemetric temperature device 10 schematic shows a crystal-controlled, oscillator circuit whose frequency is varied by the temperature characteristics of the crystal. Each device includes a coil 12 which can be a separate winding around the transformer core such as a single turn of a tape conductor which can be very thin to minimize any disturbance of the electrical field within the winding. The turn can be located inside or outside of the winding and provides a high voltage, e.g., up to about 250 volts alternating current across its terminals. The remainder of the power supply for the device includes diode 14 that blocks the negative half cycle of the voltage supply developed across coil 12 and provides a source of direct current voltage for operation of the device.

The remainder of the device is a crystal-controlled oscillator circuit which employs transistor 16 in a conventional shunt fed crystal controlled colpitts oscillator circuit. The power supply across transistor 16 is provided with a current limiting resistor 18. The bias to the base of the transistor is provided by resistor 20. The oscillator feed-back network includes capacitors 22 and 24 which are in colpitts configuration with the temperature sensitive component of the circuit, crystal 28. The feedback circuit to the emitter includes resistor 26.

The frequency which is selected as the basic or nominal oscillator frequency can be any of a wide frequency range. It should be appreciated that the crystal oscillator is utilized as the temperature sensing device and thus its frequency is variable with temperature as will be described in detail below. This frequency range, e.g., from 10,000 to about $1 \times 10^6$ Hertz, preferably from 25,000 to about 200,000 Hertz, is sufficiently high enough to eliminate magnetic effects in the transformer core. Crystal 28 is selected to have an effective frequency response to temperature change. For this purpose a D.T. or X-cut quartz crystal can be employed, the latter being preferred because of higher frequency-temperature coefficients. As an illustration, a D.T. quartz crystal has a negative temperature coefficient of 0.0002% per degree C. in the temperature range from 25° to 160° C. Accordingly, for a resonant frequency for the crystal of 165 KHz, the frequency change for a 95° change in temperature is minus 31.35 Hz, a change which is well within the sensitivity of a suitable detection circuit.

The oscillatory signal developed across the electrodes of transistor 16 is coupled to suitable telemetry means. In the preferred embodiment, the coil 12 used to obtain the induced voltage power supply can also be utilized as a coupling means between the oscillator output and the transformer windings. This is accomplished by coupling capacitor 30 which is connected between the collector transistor 16 and the terminals of coil 12, blocking the lower frequency power supply voltage while transmitting the higher frequency oscillatory signal output of the device. The coil 12 can be tuned to resonate at the carrier frequency of the oscillator signal by capacitor 32.

The crystal 28 is located inside the case of the device and is placed at a pre-selected location in the transformer windings. The case can utilize a metal housing to insure good heat conductivity between the crystal 28 and the surrounding environment. The change in temperature of crystal 28 results in a change of its resonance frequency, thereby changing its impedence in the tank circuit of the oscillator circuit, altering the frequency of the oscillating signal developed across the electrodes of transistor 16 in response to temperature changes. A temperature responsive circuit is thereby provided which utilizes a minimal number of components, particularly of semi-conductor components, and which has a minimal number of inductive elements that would be influenced by variable loadings on the transformer.

Figure 2:
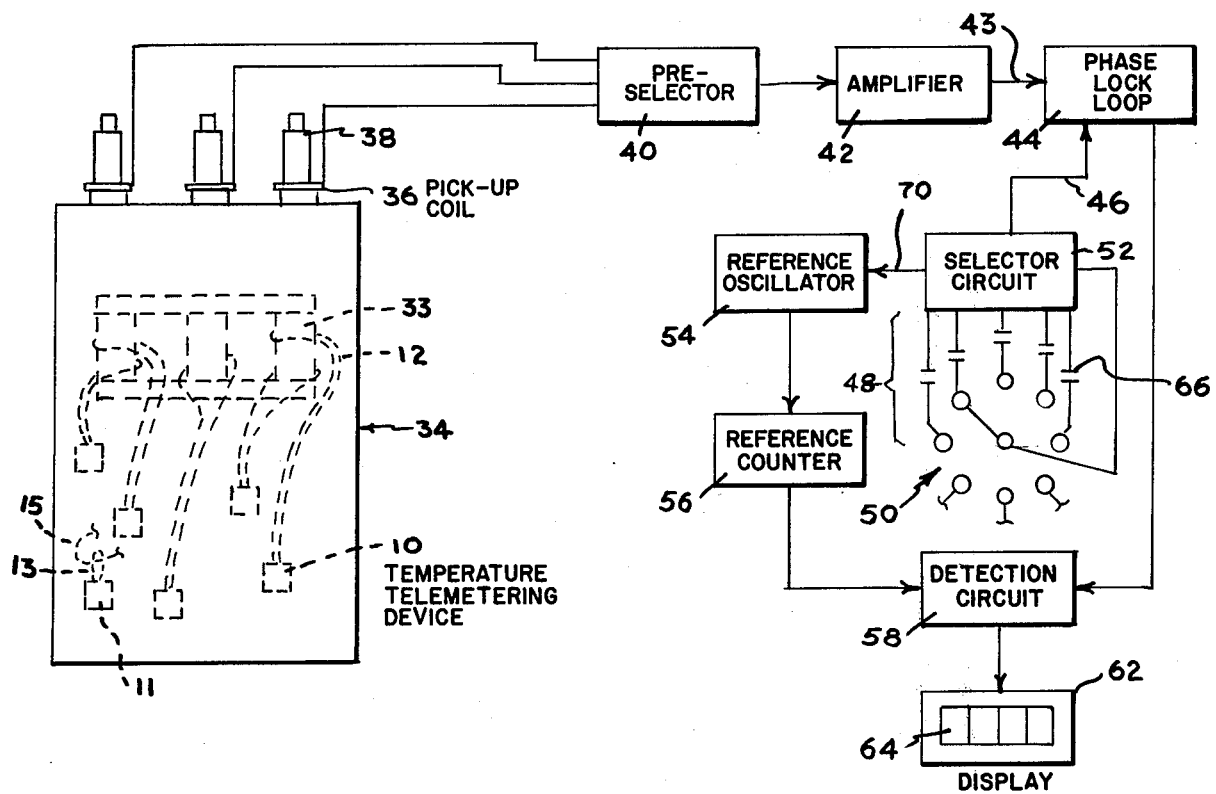
FIG. 2 is a block diagram of the temperature sensing system.

The temperature-altered oscillating signal developed across the electrodes of transistor 16 can be coupled to the windings of the transformer and remotely detected, e.g., outside the transformer case with a suitable detection means. It is also possible to position a detection means inside the transformer case. FIG. 2 illustrates a transformer 34 which is provided with a plurality of detectors 10 that are embedded at pre-selected locations throughout the windings of the transformer. The coils 12 of devices 10 can be looped about the transformer cores 33 or about a transformer winding such as coil 13 of device 11 which loops about winding 15. Each of the devices employed in a single transformer floats on the actual voltage at its particular location. Each device can be assigned a distinct carrier frequency as determined by the characteristics of the particular crystal, or other components of the oscillator circuit.

The oscillation signals are carried through the core and/or winding of the transformer to the pick-up means 36 which can comprise a winding of several turns of a conductor around the bottom portion of the ceramic bushings 38 on the output terminal of the transformer. Alternately a separate coil of many turns, wound on a ferrite rod (similar to a conventional A.M. radio antenna) can be located at some conventional location within the transformer case near the outside wall to pick up the fringe fields generated by the sensing oscillator. This coil is remote from the temperature devices and can be at the ground voltage potential, permitting direct connection to the signal processing facilities. The detection device 36 includes an inductive tank circuit with the windings to provide a high impedance circuit with a resonant frequency at the carrier frequency of the oscillation circuit, thereby rejecting the 60 Hz transmitted from the transformer 34. The detected signal can then be processed by pre-selector circuit 40 which can be a circuit including passive components such as a capacitor, coil, and the like, to further reject background noise from induced voltages of the 60 Hz power signal. The filtered signal is then transmitted to a radio frequency amplifier 42 which can be a conventional amplifier such as an LM 382 from National Semiconductor Corporation, 2900 Semiconductor Drive, Santa Clara, California.

The amplified signal is passed to a phase locked loop circuit 44. The phase locked loop circuit is a commercially available component such as Model #567 from Signetics Corporation, 811 East Arques Avenue, Sunnyvale, California. The phase locked loop circuit 44 functions as a filter to derive a pure frequency signal from the received signal at the appropriate carrier frequency which is transmitted through conductor 43 from the radio frequency amplifier means generally indicated at 42.

The selector means 48 includes a selector dial switch 50 that is connected to an oscillator circuit 52 to set the phase locked loop to a pre-selected frequency, corresponding to the frequency of the detector to be read, which is connected to the phase locked loop circuit 44 for control of this circuit. The selector circuit includes selector switch 50 operative to connect one of a plurality of capacitors 66 of different capacitance values in the resonant circuit of the oscillator circuit whereby a voltage signal of a precise frequency is developed and applied to an input terminal of the phase locked loop circuit 44 through conducting lead 46. The selector circuit 52 is also connected by lead 70 to a radio frequency reference oscillator 54 to control the frequency of the output signal of this oscillator.

Figure 3:
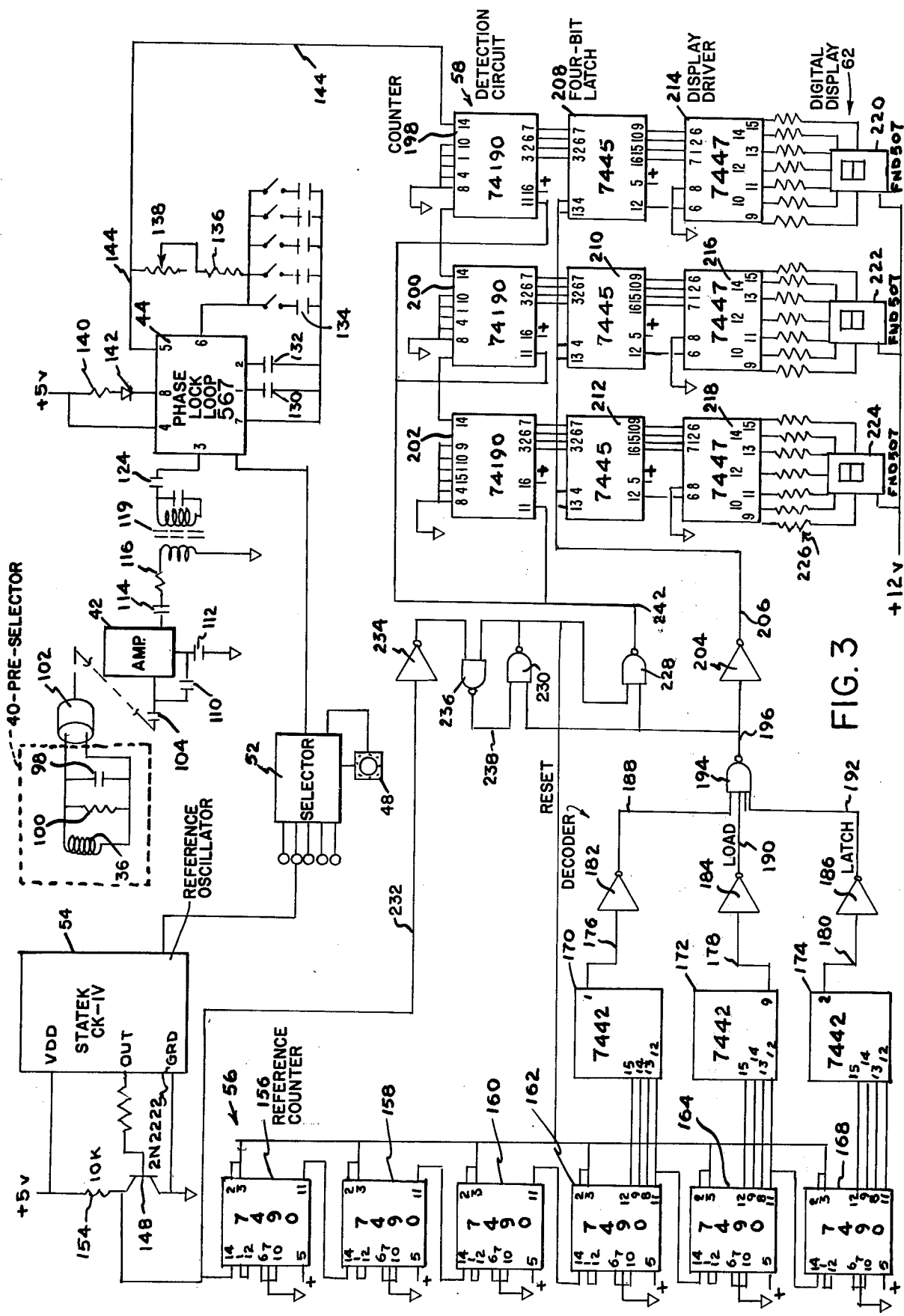
FIG. 3 is a diagram of the receiver signal processing facilities.

Referring now to FIG. 3, a single channel of the telemetering receiver is shown to include coil 36 which forms a tuned circuit pick up together with capacitor 98 and damping resistor 100. The received radio frequency energy is transmitted through a shielded cable 102 through capacitor 104 to the input to an integrated circuit radio frequency amplifier 42. The illustrated amplifier includes compensating capacitors 110 and 112 conventionally connected to the amplifier 42. The amplifier 42 is available as part LM 382 from National Semiconductor Corporation.

The output of amplifier 42 is connected through series capacitor 114 and resistor 116 to the primary winding 118 of a conventional and commercially available intermediate frequency transformer 119, 19 kHz transformer from J. W. Miller Division of Bell Industries, 19070 Reyes Ave., Compton, Calif.

The secondary 120 of the transformer 119 forms part of a tuned circuit with capacitor 122 connected through capacitor 124 to the input of the phase locked loop circuit 44 which also receives the selected capacitance value from selector circuit 52. The phase locked loop circuit 44 is commercially available as #567 from Signetics Corporation, 811 E. Arques Avenue, Sunnyvale, Calif.

The phase locked loop circuit 44 is conventionally compensated by means of capacitors 130 and 132 and timing capacitors 134, selected by selector circuit 52, resistor 136 and potentiometer 138. The power supply is connected through resistor 140 and light emitting diode (LED) 142 to the load terminal. The clock output on line 144 is, therefore, substantially a noise free square wave pulse signal corresponding to the oscillator frequency of the selected probe and serves as the input to the digital circuitry which provides a digital readout of the probe temperature.

Reference oscillator 54 is provided which feeds a driving transistor 148 to provide pulses on line 150 at the same basic rate as those generated by the selected oscillator 88 within the probe. To this end, its signal frequency is controlled by selector circuit 52. The reference oscillator can be conventionally available such as Model CK-IV from Statek Corporation, 1200 Alvarez Avenue, Orange, Calif. 92668. Transistor 148 has an input resistor 152 and a collector resistor 154 in a conventional switch configuration. The reference oscillator 54 provides pulses on line 150 of a nominal preselected frequency which are applied to the input of reference counter 56 which includes a string of series-connected decade counters 156 through 168. The decade counters 156–168 are conventional units in the 54/74 series of transistor-transistor logic devices available from numerous manufacturers.

The decade counters 156 through 168 count pulses from the reference oscillator 146 until a preset number appears in the three most significant digit positions of the sample count. The number count of the pulses is detected by three BCD-to-decimal decoders 170, 172, and 174 connected to the outputs of the decade counters 162, 164, and 168 containing the three most significant digits of the sample count. The BCD-to-decimal decoders are also devices in the 54/74 series and are readily available.

When a predetermined count is decoded, appropriate signals on lines 176, 178, and 180 are connected through inverters 182, 184, and 186, the outputs of which, on lines 188, 190, and 192, are connected as inputs to a NAND gate 194 which generates a sample complete signal on an output line 196.

While the reference oscillator pulses are being counted by the series of decade counters 156–168, the probe output pulses on line 144 are being fed to the temperature error detection circuit 58 which includes three series-connected up-down decade counters 198, 200 and 202. The decade counters 198, 200, and 202 are also available as part of the 54/74 series. It should be appreciated that the up-down decade counters 198, 200, and 202 will contain only the three least significant digits of the sample time, and any number in those decade counters at the completion of the sample time represents a difference in frequency between the probe oscillator and the reference oscillator. As it is desired that the count in the decade counter 198, 200 and 202 at the completion of the sample time represent an actual temperature, a calibration number is preset into the decade counters prior to the beginning of the sample time. Thus, by properly presetting the decade counters, and the length of the sample time, the count remaining in the decade counters 198, 200 and 202 will be a number indicating actual probe temperature.

In order to display the number in the decade counter 198, 200 and 202 in the digital display 62 at the completion of the sample time, the sample complete signal on line 196 is fed through an inverter 204 to generate a latch signal on line 206 which is applied to the load inputs of a series of four-bit latches 208, 210, and 212, also from the 54/74 series, which hold the final number in the decade counters 198, 200 and 202 at the completion of the sample time. The output of the latches 208, 210, and 212 is connected to a series of seven-segment light emitting diode display drivers 214, 216, and 218 which in turn drive three light emitting diode display devices 220, 222 and 224, conventionally connected to the drivers through resistors 226. The light emitting diode display devices are conventional units available as part #FND507 from Fairchild Camera & Instrument Corp., Syosset, N.Y.

When the number in the decade counter 198, 200 and 202 has been transferred to the latches 208, 210 and 212 by means of the latch signal on line 206, the decade counters must then be reset to the predetermined calibration number for the next sample time and the sample time counters 156–168 must also be reset. This is effected by connecting the sample complete signal on line 196 to one of the inputs of each of a pair of NAND gates 228 and 230. The NAND gate 230 is enabled by one of the pulses from the reference oscillator on line 232 which is fed through an inverter 234 to a NAND gate 236 which supplies an enabling input on line 238 to the NAND gate 230 which then generates a reset pulse on line 240 connected to the decade counters 156–168. The reset pulse on line 240 also enables the NAND gate 228 which then generates a load signal on line 242 which causes the predetermined calibration number to be loaded into the up-down decade counters 198, 200 and 202. The next sample time is then evaluated.

The invention has been described by reference to the illustrated and preferred embodiment. It is not intended that the invention be unduly limited by this description. Instead it is intended that the invention be defined by the means, and obvious equivalents thereof, set forth in the following claims.

What is claimed is:

1. A telemetric temperature device for indication of local temperature within an electrical transformer which comprises the following components floating on the local potential within said transformer:
    (a) coil means in inductive coupling to windings of said transformer;
    (b) rectifier means in circuit with said coil means to obtain a direct current voltage therefrom;
    (c) oscillator circuit means in driven connection to said rectifier means to generate an oscillatory signal;
    (d) temperature responsive circuit component means in temperature sensing relationship to a selected region of said transformer and coupled in said oscillator circuit to alter the frequency of said oscillatory signal in response to sensed temperature of said selected region; and
    (e) transmission means in circuit with said oscillator circuit means for telecommunication of the frequency altered oscillatory signal.

2. The device of claim 1 wherein said transmission means comprises a coupling circuit from said oscillator circuit means to said coil means.

3. The device of claim 2 wherein said coupling circuit includes capacitive means.

4. The device of claim 3 wherein said coupling circuit includes capacitive means across said coil to provide a frequency tuned circuit at the nominal frequency of said oscillatory signal.

5. The device of claim 1 wherein said oscillator circuit means is a crystal-controlled oscillator circuit having a feed-back network which includes, as said temperature responsive component means, a frequency-temperature responsive crystal.

6. The device of claim 5 wherein said oscillator circuit means generates a radio frequency signal.

7. The device of claim 5 wherein said oscillator circuit means generates a signal with a frequency from 10,000 to about 1,000,000 Hz.

8. An electrical transformer having core means and a plurality of windings within a transformer housing and in combination therewith a plurality of telemetric temperature probes, each at preselected positions and floating on the local potential at its position within said transformer and comprising:
  (a) inductive power supply means;
  (b) oscillator circuit means in driven connection to said power supply means to generate an oscillatory signal;
  (c) temperature responsive circuit component means in temperature sensing relationship to a selected region of said transformer and coupled in said oscillatory circuit to alter the frequency of said oscillatory signal in response to sensed temperature of said selected region; and
  (d) transmission means in circuit with said oscillator curcuit means for telecommunication of the frequency altered oscillatory signal.

9. The combination of claim 8 wherein said power supply means includes:

(a) coil means in inductive coupling to windings of said transformer; and
  (b) rectifier means in circuit with said coil means to obtain a direct current voltage therefrom.

10. The combination of claim 9 including a plurality of said probes at preselected positions in said windings wherein each of said probes includes coupling circuit means from said oscillator circuit means to said coil means.

11. The combination of claim 10 wherein said coupling circuit includes capacitive means across said coil means to provide a frequency tuned circuit at the basic frequency of said oscillatory signal.

12. The combination of claim 11 with signal receiver means external of said transformer housing and including coil means about the high voltage terminals of said transformer.

13. The combination of claim 12 including a phase locked loop circuit receiving said frequency altered oscillatory signal in combination with other signals and noise, and generating a temperature oscillatory signal therefrom at the frequency of said frequency altered signal.

14. The combination of claim 12 including means to generate a reference oscillatory signal at the basic frequency of a selected one of said plurality of probes and means to compare the reference signal to the temperature oscillatory signal from said phase locked loop oscillator.

15. The combination of claim 14 including means to display a temperature value responsive to the difference in frequency between said reference and temperature oscillatory signals.

* * * * *